US009325855B2

(12) United States Patent
Liu et al.

(10) Patent No.: US 9,325,855 B2
(45) Date of Patent: Apr. 26, 2016

(54) ECHO ELIMINATION DEVICE AND METHOD FOR MINIATURE HANDS-FREE VOICE COMMUNICATION SYSTEM

(71) Applicant: Goertek Inc., Weifang, ShanDong Province (CN)

(72) Inventors: Song Liu, Weifang (CN); Shasha Lou, Weifang (CN); Bo Li, Weifang (CN)

(73) Assignee: Goertek, Inc., Weifang, Shandong Province (CN)

( * ) Notice: Subject to any disclaimer, the term of this patent is extended or adjusted under 35 U.S.C. 154(b) by 0 days.

(21) Appl. No.: 14/411,669

(22) PCT Filed: Dec. 12, 2013

(86) PCT No.: PCT/CN2013/001558
§ 371 (c)(1),
(2) Date: Dec. 29, 2014

(87) PCT Pub. No.: WO2014/094359
PCT Pub. Date: Jun. 26, 2014

(65) Prior Publication Data
US 2015/0172468 A1    Jun. 18, 2015

(30) Foreign Application Priority Data

Dec. 20, 2012 (CN) .......................... 2012 1 0556804

(51) Int. Cl.
*H04M 9/08* (2006.01)
*H04B 3/20* (2006.01)

(52) U.S. Cl.
CPC *H04M 9/082* (2013.01); *H04B 3/20* (2013.01)

(58) Field of Classification Search
None
See application file for complete search history.

(56) References Cited

U.S. PATENT DOCUMENTS

2003/0039353 A1    2/2003 Matsuo
2010/0189274 A1*   7/2010 Thaden ................... G10L 21/02
                                                          381/66

(Continued)

FOREIGN PATENT DOCUMENTS

CN    102387273    3/2012
CN    202197344    4/2012

(Continued)

OTHER PUBLICATIONS

PCT/CN2013/001558, Written Opinion dated Feb. 20, 2014, Chinese and English Versions, 14 pages.

(Continued)

*Primary Examiner* — Diane Mizrahi
(74) *Attorney, Agent, or Firm* — Boyle Fredrickson, S.C.

(57) ABSTRACT

The present invention discloses an echo elimination device and method for a miniature hands-free voice communication system. The system comprises a receiver, a primary transmitter and an auxiliary transmitter, a distance from the primary transmitter to the receiver being greater than that from the auxiliary transmitter to the receiver. The device comprises an array echo elimination unit, a self-adaptive echo elimination unit and a residual echo elimination unit, which are structurally cascaded in turn. The array echo elimination unit, with inputs being a signal of the primary transmitter and a signal of the auxiliary transmitter, performs array filtering to obtain one path of output signals; the self-adaptive echo elimination unit, with the input signals being a signal of the receiver, the output signal of the array echo elimination unit and a signal of the auxiliary transmitter, performs self-adaptive filtering to obtain two paths of output signals; the residual echo elimination unit, with the input signals being the two paths of output signals of the self-adaptive echo elimination unit, performs voice probability estimation and echo matching to obtain an echo-eliminated voice signal. Thus, the duplex performance can be enhanced, and the phase consistency of the transmitters is not strictly required.

10 Claims, 11 Drawing Sheets

(56) References Cited

U.S. PATENT DOCUMENTS

2010/0234720 A1* 9/2010 Tupin, Jr. ............. A61B 5/05
600/407
2014/0112467 A1* 4/2014 Wyss ................. H04B 3/23
379/406.08

FOREIGN PATENT DOCUMENTS

| CN | 103051818 | 4/2013 |
| CN | 203104592 | 7/2013 |

OTHER PUBLICATIONS

CN 201210556804.0, Notification to Grant an Invention Patent, dated Aug. 5, 2014, 3 pages, and English Translation, 3 pages.
CN 201210556804.0, The First Office Action, Jan. 6, 2014, 7 pages, and English Translation, 8 pages.
CN 201210556804.0, The Second Office Action, Jun. 18, 2014, 3 pages, and English Translation, 3 pages.

\* cited by examiner

ECHO ELIMINATION DEVICE AND METHOD FOR MINIATURE HANDS-FREE VOICE COMMUNICATION SYSTEM

TECHNICAL FIELD

The present invention relates to the technical field of echo elimination, and particularly to an echo elimination device and method for a miniature hands-free voice communication system.

BACKGROUND ART

Echo usually occurs in voice communications. After a signal to the receiving side is played by a receiver (also referred to as a headphone, an SPK or an earphone, etc.), crosstalk of this signal into a received signal of the transmitting side (also referred to as a microphone or a sound pickup, etc.) is realized through lines and acoustic reflection, and then this signal is fed to a far-end, so that a far-end correspondence contact person hears the echo. Echo will bring about great interference to both parties of a call, thereby influencing the quality of the call. In the event of large echo, it is also possible to cause the squeaking of the receiver and thus damage the receiver. In order to guarantee the quality of a call and the security of equipment, it is necessary to suppress echo in the voice communication.

From the generation mechanism, echo may be classified into two types, i.e., a linear echo component and a nonlinear echo component, wherein the linear echo component is generated by amplification and acoustic transmission of electroacoustic circuits, while the nonlinear echo component is generated by nonlinear distortion and acoustic transmission of a receiver. A self-adaptive echo elimination technology is usually employed for elimination of the linear echo component. Widely applied and mature, this technology may eliminate the linear echo component without damaging near-end voice. However, the elimination of the nonlinear echo component is likely to damage the near-end voice, thereby degrading the duplex performance, or even making channels be half-duplex.

The half-duplex phenomenon is very common in miniature hands-free voice communication equipment, because the receiver of such equipment, for example, a mobile phone or speakerphone having a hands-free function, has large nonlinear distortion and nonlinear echo component. With the increasing requirements on the fluency and conform level of voice communication, it is required to protect near-end voice and ensure duplex effect while suppressing echo. As the duplex loss mainly occurs during the elimination of the nonlinear echo component, it is particularly required to improve the nonlinear echo component elimination technology.

For the echo elimination of miniature hands-free voice communication equipment, one method for enhancing the duplex performance is to combine echo filtering and array space filtering with the help of a transmitter array, and then realize echo extraction and voice separation by signal difference of echo transmitted to each transmitter. For example, in the method as disclosed in Chinese Patent Application No. 201110326010.0, an approximately full-duplex call may be realized by array signal processing and echo elimination. However, this method needs to accurately judge the direction of arrival of echo and near-end voice to the transmitter array, so the consistency of transmitters is highly required. Not only the sensitivity of the transmitters needs to be consistent, the consistency of phase is much more required, so a strictly acoustic design is needed. However, in miniature hands-free equipment, due to compact structure and limited size, it is difficult to meet the requirements of the acoustic design, particularly of phase consistency. Therefore the application of this method is limited.

SUMMARY OF THE INVENTION

The present invention provides an echo elimination device and method for a miniature hands-free voice communication system. This device and method relieve the damage to the near-end voice while reducing echo, enhance the duplex performance and do not strictly require the phase consistency of transmitters. To achieve the above objects, the present invention employs the following technical solutions.

The present invention discloses an echo elimination device for a miniature hands-free voice communication system. The miniature hands-free voice communication system includes a receiver, a primary transmitter and an auxiliary transmitter, a distance from the primary transmitter to the receiver being greater than that from the auxiliary transmitter to the receiver, wherein the device includes an array echo elimination unit, a self-adaptive echo elimination unit and a residual echo elimination unit, which are structurally cascaded in turn; the array echo elimination unit, with inputs being a signal of the primary transmitter and a signal of the auxiliary transmitter, removes a part of linear echo component and a part of nonlinear echo component in the signal of the primary transmitter, by array filtering, so as to obtain one path of output signals; the self-adaptive echo elimination unit, with the input signals being a signal of the receiver, the output signal of the array echo elimination unit and a signal of the auxiliary transmitter, removes from the output signal of the array echo elimination unit a residual linear echo component in the signal of the primary transmitter, and removes from the signal of the auxiliary transmitter a linear echo component in the signal of the auxiliary transmitter, by self-adaptive filtering, respectively, so as to obtain two paths of output signals; and the residual echo elimination unit, with the input signals being the two paths of output signals of the self-adaptive echo elimination unit, removes a residual nonlinear echo component in the signal of the primary transmitter, by voice probability estimation and echo matching, so as to obtain one path of output signals as an echo-eliminated voice signal.

The present invention further discloses an echo elimination method for a miniature hands-free voice communication system. The miniature hands-free voice communication system includes a receiver, a primary transmitter and an auxiliary transmitter, a distance from the primary transmitter to the receiver being greater than that from the auxiliary transmitter to the receiver, wherein the method includes the following steps of: inputting a signal of the primary transmitter and a signal of the auxiliary transmitter into an array echo elimination unit, performing array filtering to remove a part of linear echo component and a part of nonlinear echo component in the signal of the primary transmitter to obtain one path of output signals; inputting a signal of the receiver, the output signal of the array echo elimination unit and a signal of the auxiliary transmitter into a self-adaptive echo elimination unit, performing self-adaptive filtering to remove from the output signal of the array echo elimination unit a residual linear echo component in the signal of the primary transmitter, and to remove from the signal of the auxiliary transmitter a linear echo component in the signal of the auxiliary transmitter, respectively, so as to obtain two paths of output signals; and inputting the two paths of output signals of the self-adaptive echo elimination unit into a residual echo elimination unit, performing voice probability estimation and echo matching to remove the residual nonlinear echo component in the signal of the primary transmitter, so as to obtain one path of output signals as an echo-eliminated voice signal.

Embodiments of the present invention have the following advantages: according to the echo elimination device and method for a miniature hands-free voice communication system provided by the present invention, by taking full use of the acoustic characteristics of the miniature hands-free voice communication system and the position information of the receiver and transmitters, and by performing overall outline matching and amplitude matching to signals of different transmitters, the amplitude-matched echo is obtained; by using the amplitude difference of the echo to different transmitters, because the larger the amplitude difference of the signals of the different transmitters is, and the smaller the near-end voice probability is, the voice probability information indicating the proportion of voice and echo in each time-frequency region can be extracted, so that a voice region is separated from an echo region. Thus, the residual echo is removed effectively while protecting the near-end voice, and the duplex performance is enhanced. Meanwhile, the phase consistency of the transmitters is not strictly required.

DETAILED DESCRIPTION OF THE INVENTION

In order to make the objects, technical solutions and advantages of the present invention clearer, the embodiments of the present invention will be further described as below in details with reference to the drawings.

Figure 1:
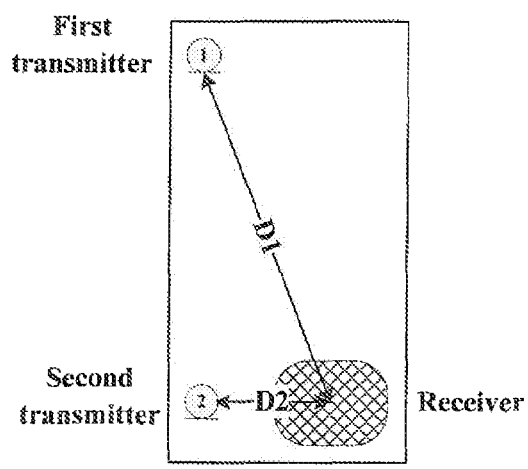
FIG. 1 is a schematic diagram of positions of a receiver and transmitters applied by an echo elimination device and method for a miniature hands-free voice communication system according to the present invention.
Figure 2:
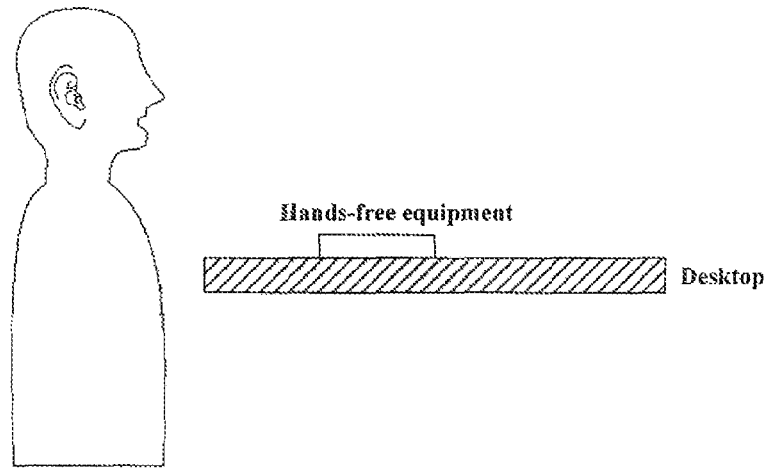
FIG. 2 is a schematic diagram of use of a small desktop hands-free voice communication system applied by an echo elimination device and method for a miniature hands-free voice communication system according to the present invention.
Figure 3:
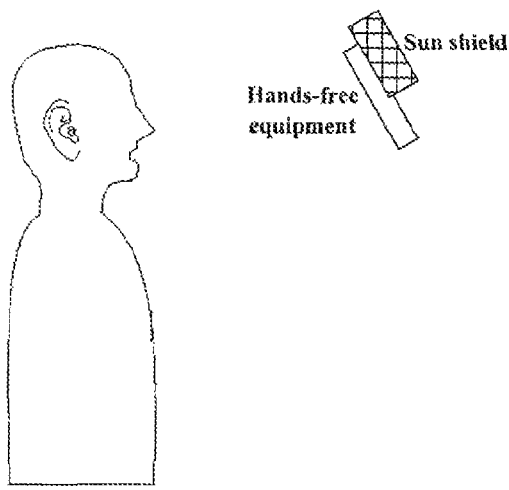
FIG. 3 is a schematic diagram of use of a small vehicle hands-free voice communication system applied by an echo elimination device and method for a miniature hands-free voice communication system according to the present invention.

FIG. 1 is a schematic diagram of positions of a receiver and transmitters applied by an echo elimination device and method for a miniature hands-free voice communication system according to the present invention. FIG. 2 is a schematic diagram of use of a small desktop hands-free voice communication system applied by an echo elimination device and method for a miniature hands-free voice communication system according to the present invention. FIG. 3 is a schematic diagram of use of a small vehicle hands-free voice communication system applied by an echo elimination device and method for a miniature hands-free voice communication system according to the present invention. For a user, the distances from the user to transmitters (for example, microphones) are approximately equal, that is, the near-end voice signals received by each transmitter from the user are basically identical. However, for a receiver (for example, a loudspeaker), the distances from the receiver to the transmitters are not equal. If the distance from the receiver to a primary transmitter is D1 and the distance from the receiver to an auxiliary transmitter is D2, and when D1>D2, the echo received by the two transmitters from the receiver has a difference in power, while the near-end voice received by the two transmitters from the user is nearly identical, so the voice may be distinguished from the echo according to the difference of power relations, so that the purpose of separating voice from echo is achieved. The present invention rightly utilizes the power difference to separate voice from echo. In this embodiment, D1>=2D2, for example, D1=13 cm and D2=4 cm. At this time, the power difference is obvious between the echoes received by the two transmitters from the receiver because D1 and D2 are different obviously, so that the effect is better.

Figure 4A:
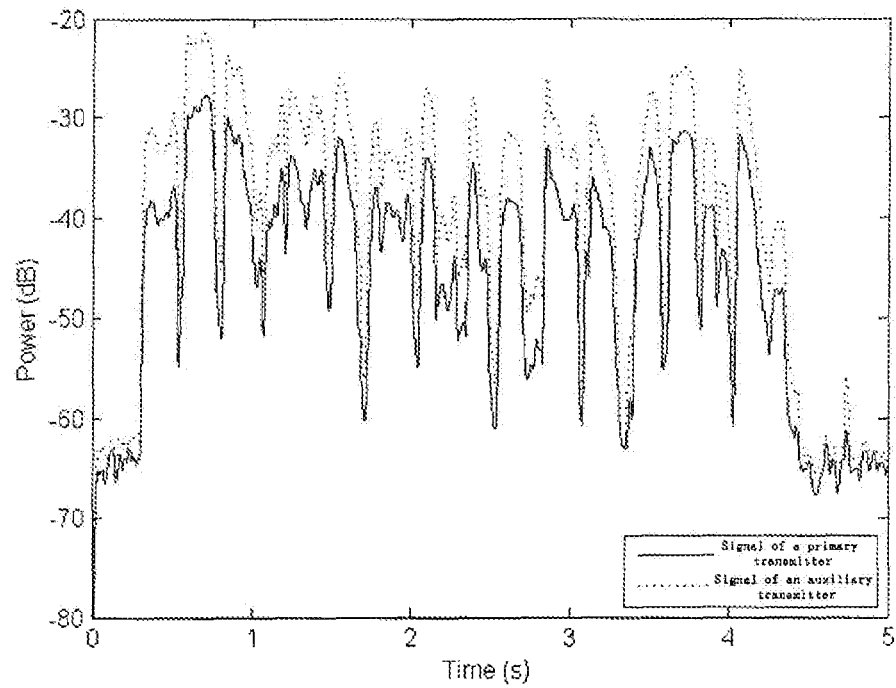
FIG. 4(a) is a schematic diagram of power curves of echo components in signals of two transmitters.
Figure 4B:
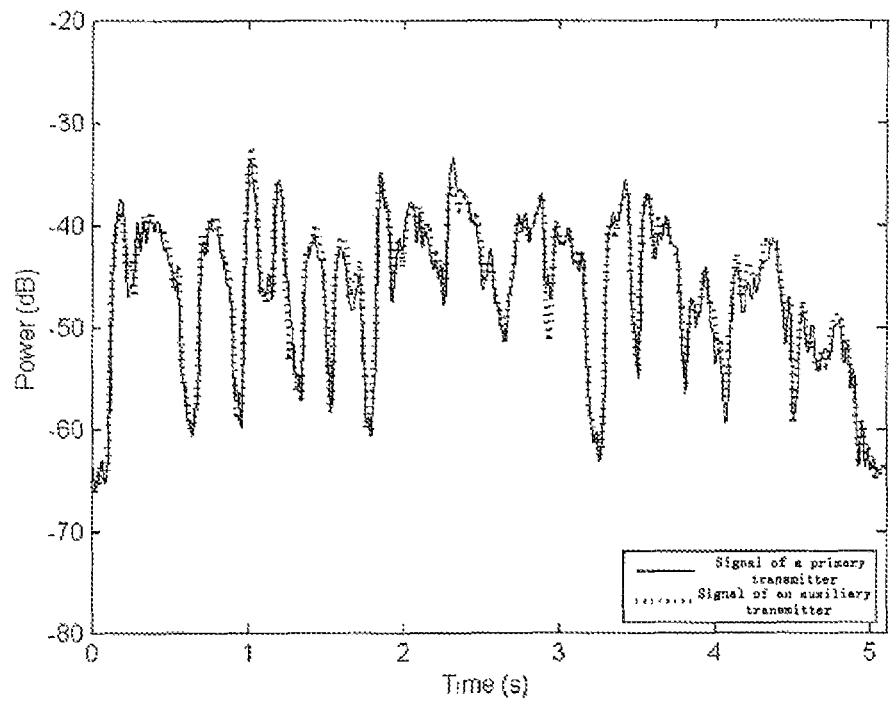
FIG. 4(b) is a schematic diagram of power curves of near-end voice components in signals of primary and auxiliary transmitters.
Figure 4C:
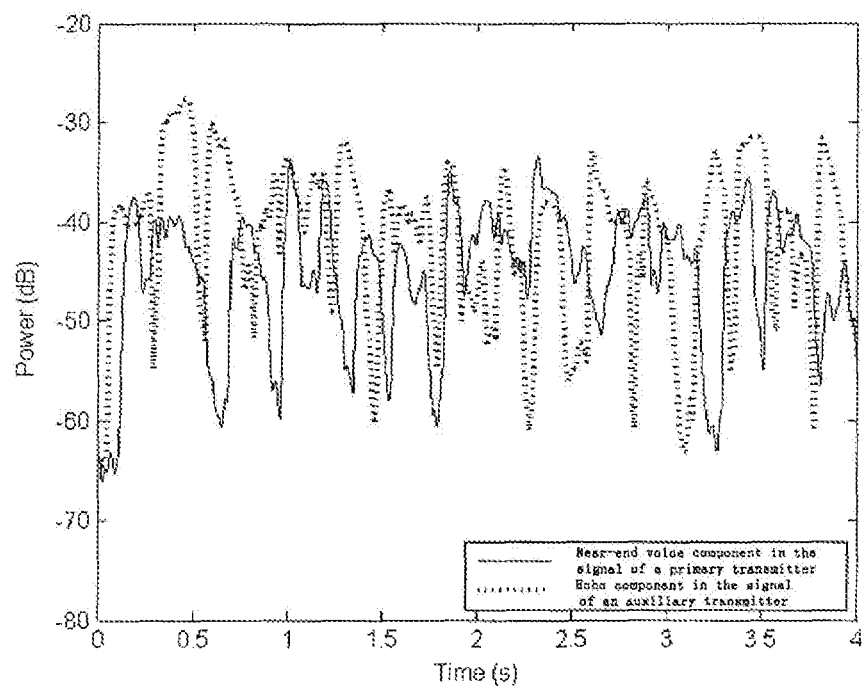
FIG. 4(c) is a schematic diagram of power curves of an echo component and a near-end voice component in a primary transmitter.
Figure 5A:
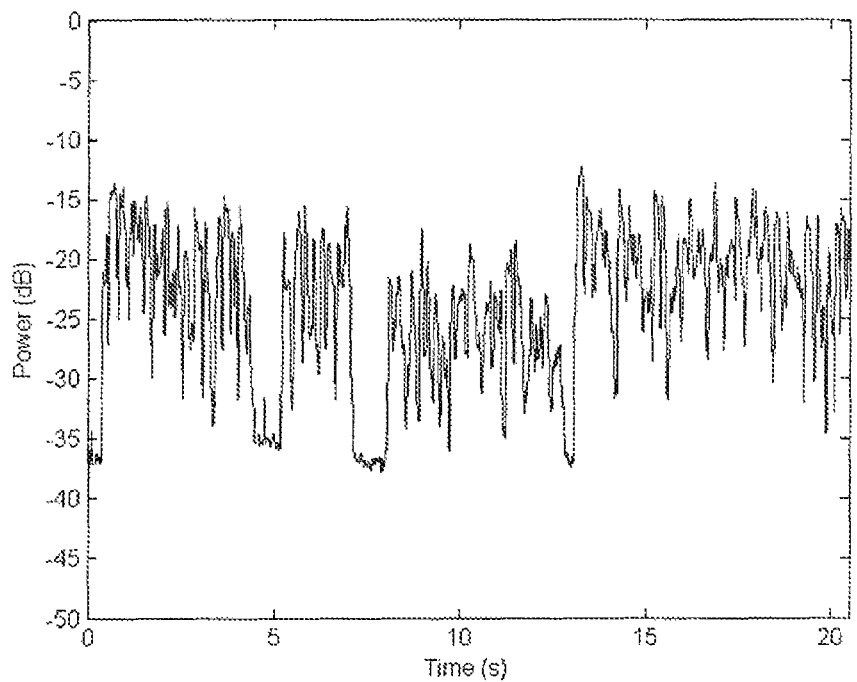
FIG. 5(a) is a schematic diagram of a power curve of a signal of a primary transmitter.
Figure 5B:
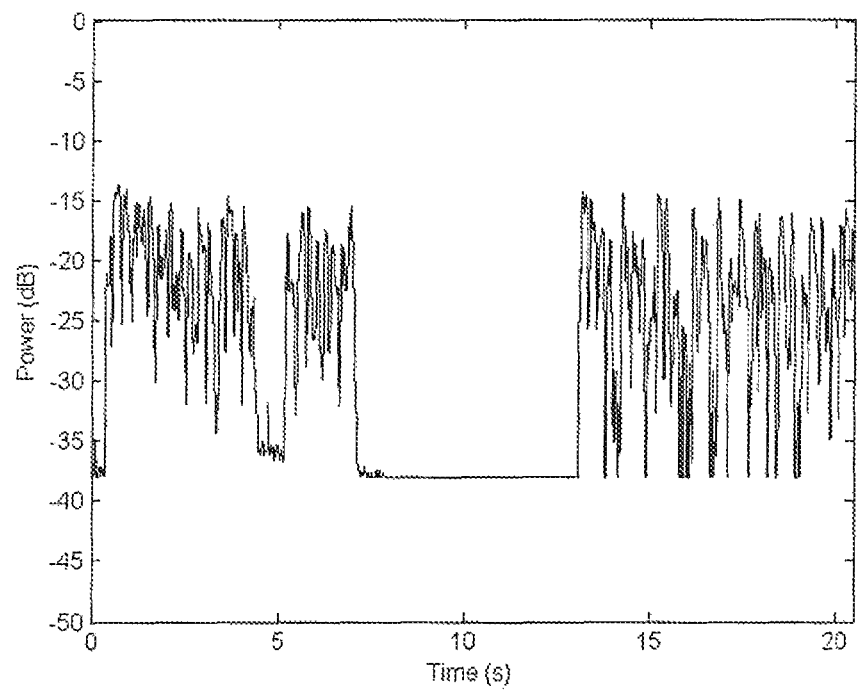
FIG. 5(b) is a schematic diagram of a power curve of an echo component of a primary transmitter.
Figure 5C:
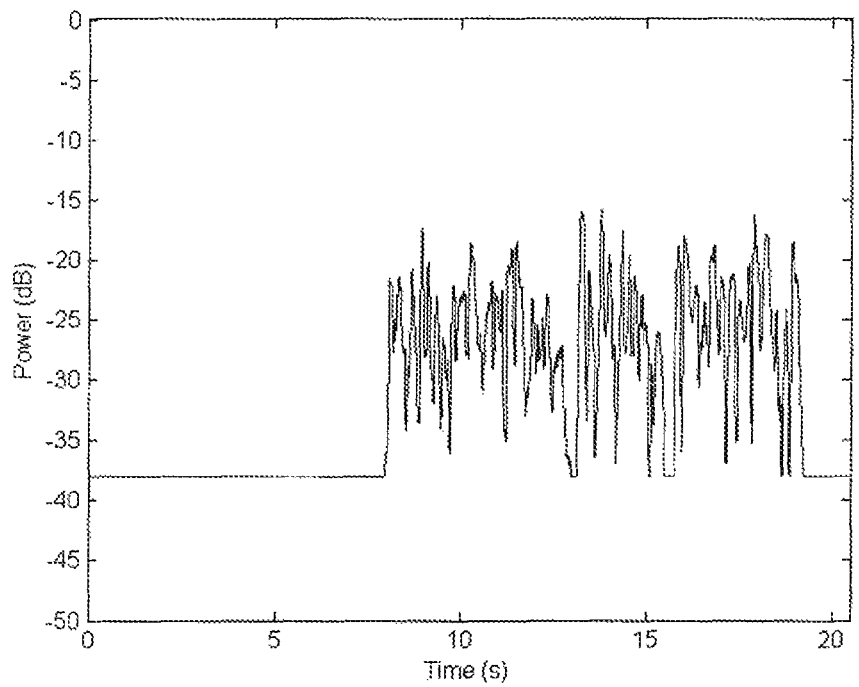
FIG. 5(c) is a schematic diagram of a power curve of a near-end voice component of a primary transmitter.

FIG. 4(a) is a schematic diagram of power curves of echo components in signals of two transmitters; FIG. 4(b) is a schematic diagram of power curves of near-end voice components in signals of primary and auxiliary transmitters; and FIG. 4(c) is a schematic diagram of power curves of an echo component and a near-end voice component in a primary transmitter. FIG. 5(a) is a schematic diagram of a power curve of a signal of a primary transmitter; FIG. 5(b) is a schematic diagram of a power curve of an echo component of a primary transmitter; and FIG. 5(c) is a schematic diagram of a power curve of a near-end voice component of a primary transmitter. In conclusion, the signals of the transmitters have the following characteristics:

First, as seen from FIG. 4(a) and FIG. 4(b), the echo components in the signals of the two transmitters have an obvious power difference, and the echo component in the signal of an auxiliary transmitter is, 6 dB or more, higher than that in the signal of a primary transmitter. This is because the echo power is approximately in inverse proportion to the distance from a transmitter to a receiver. As the distance from the auxiliary transmitter to the receiver is closer, the received echo is larger.

Second, as seen from FIG. 4(b), the power of the near-end voice components in the signals of the transmitters is approximate. This is because the distances from the mouth of a near-end talker to the two transmitters are approximately equal in general applications. Therefore, the near-end voice power received by the two transmitters is also approximate.

Third, as seen from FIG. 4(c), in the primary transmitter, the power of the near-end voice is slightly about 3-6 dB lower than that of the echo. In addition, as seen from the spectrograms shown in FIGS. 5(a)-5(c), when the near-end voice and the echo appear simultaneously, the near-end voice will be masked by the echo in some time-frequency regions.

Figure 6:
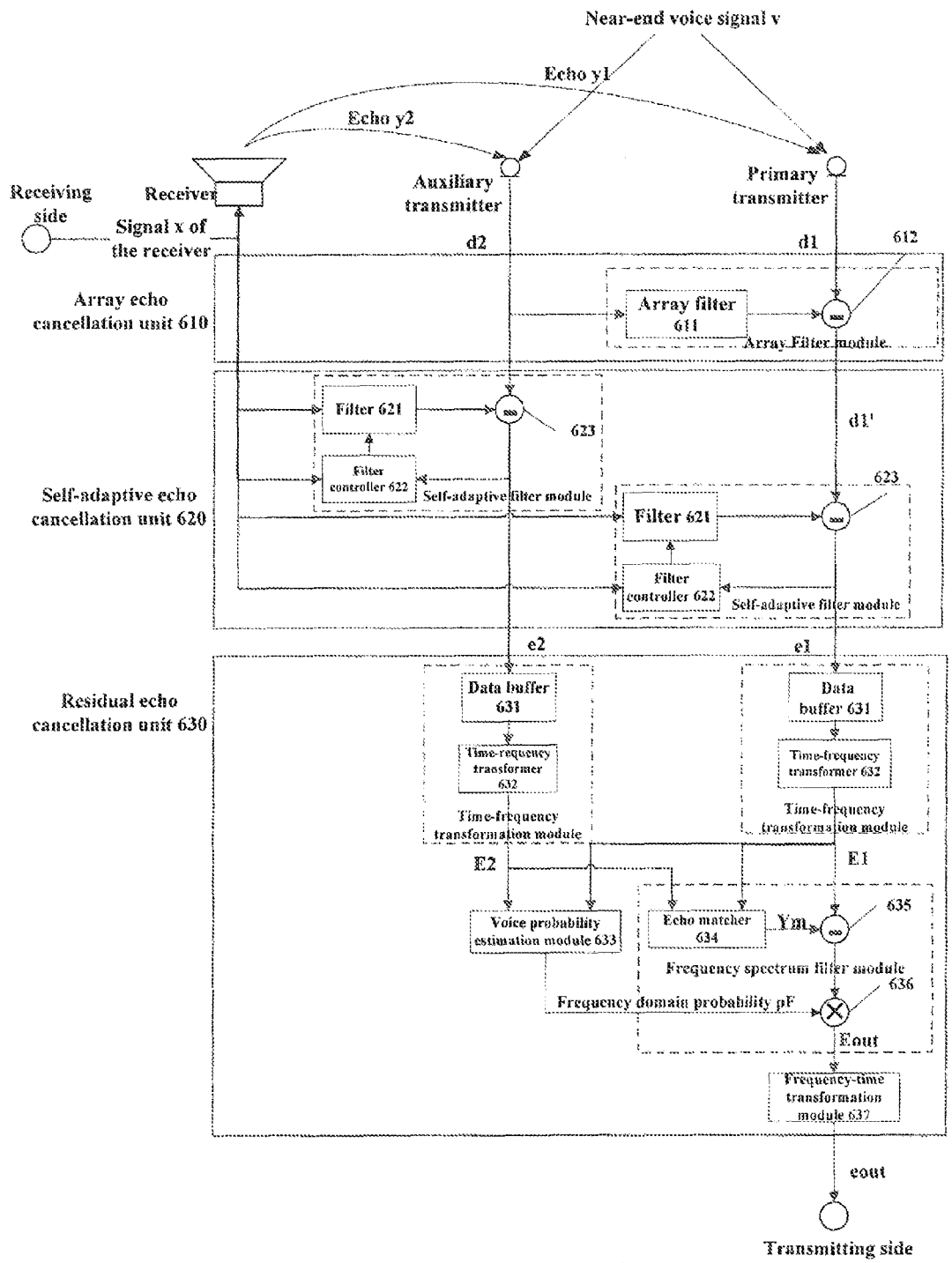
FIG. 6 is a block diagram of an echo elimination device for a miniature hands-free voice communication system according to a preferred embodiment of the present invention, in a use state.
Figure 7:
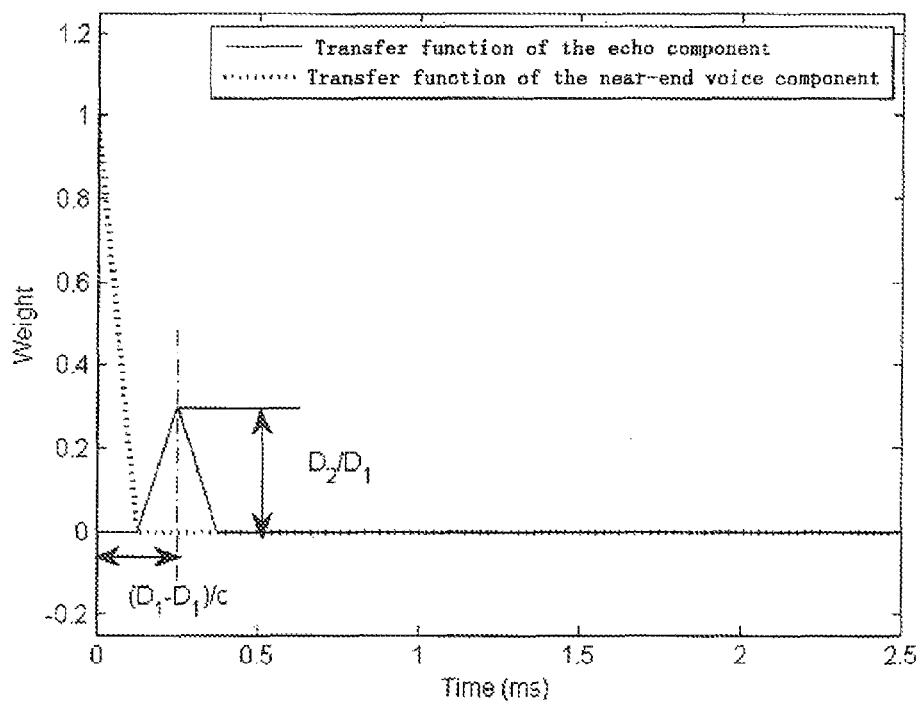
FIG. 7 is a schematic diagram of a transfer function of each signal component from an auxiliary transmitter to a primary transmitter.
Figure 8:
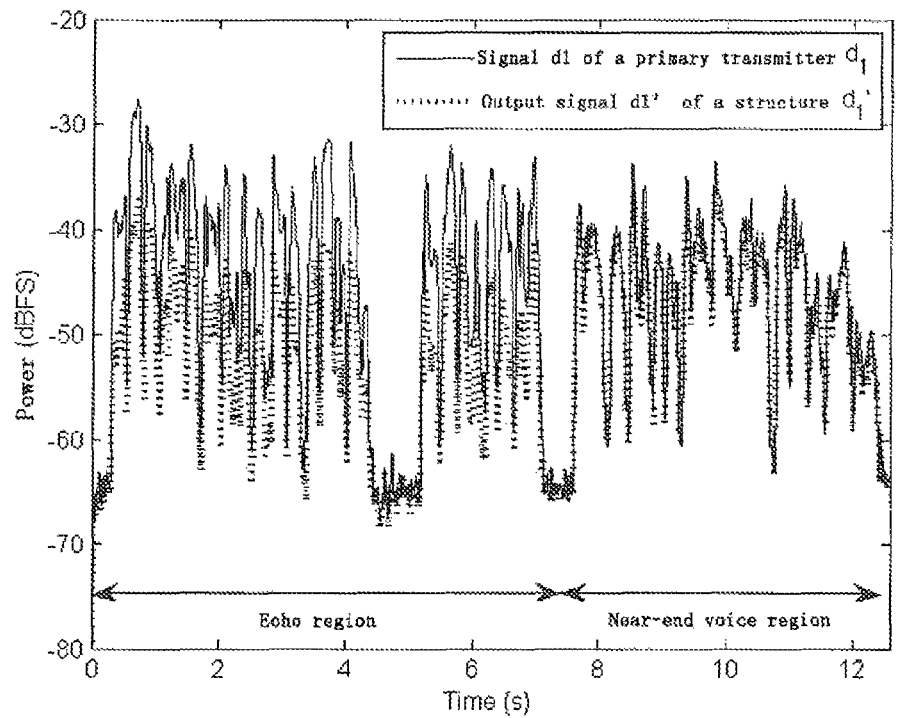
FIG. 8 is a schematic diagram of power curves of a signal of the primary transmitter and an array-filtered output signal.
Figure 9:
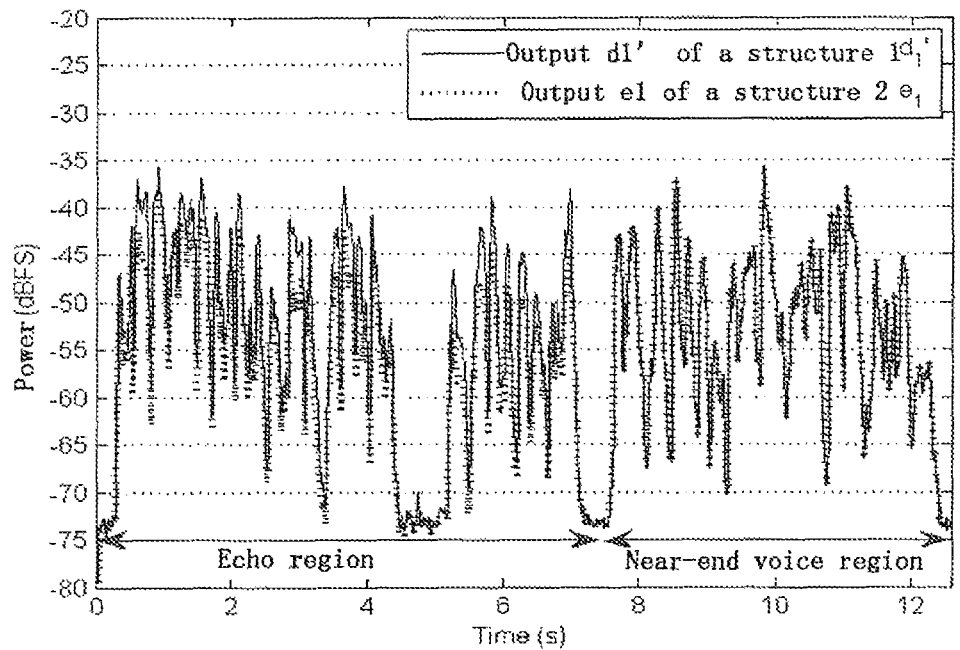
FIG. 9 is a schematic diagram of power curves of an output signal of an array filter module and a first self-adaptive filter signal obtained by self-adaptive echo filtering.
Figure 10:
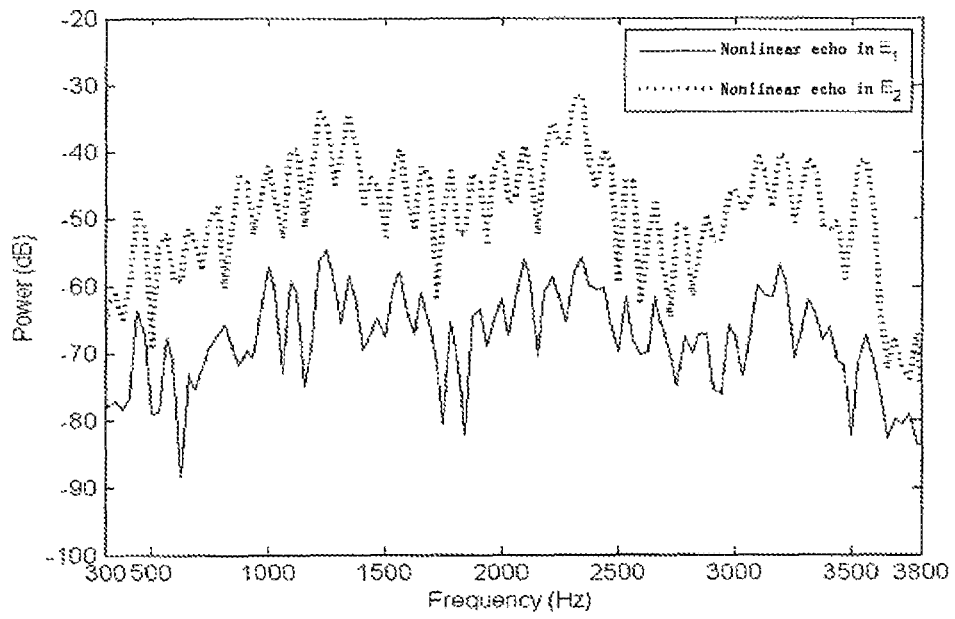
FIG. 10 is a schematic diagram of power curves of nonlinear echo components of a first self-adaptive filter signal and a second self-adaptive filter signal.
Figure 11:
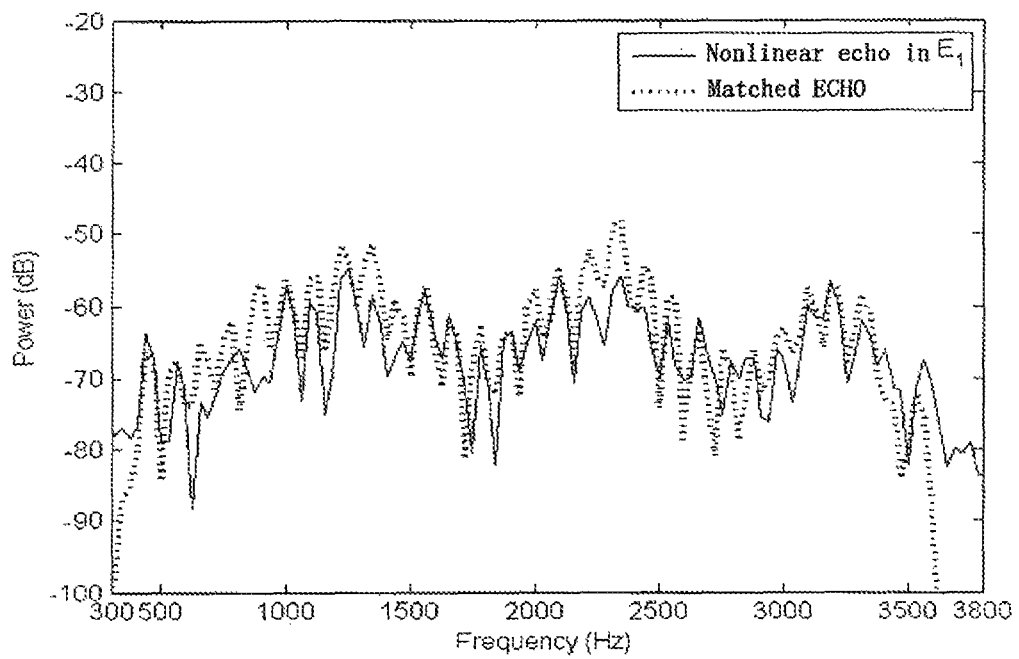
FIG. 11 is a schematic diagram of a power curve of a nonlinear echo of a first self-adaptive filter signal and a power curve of a matched echo.
Figure 12A:
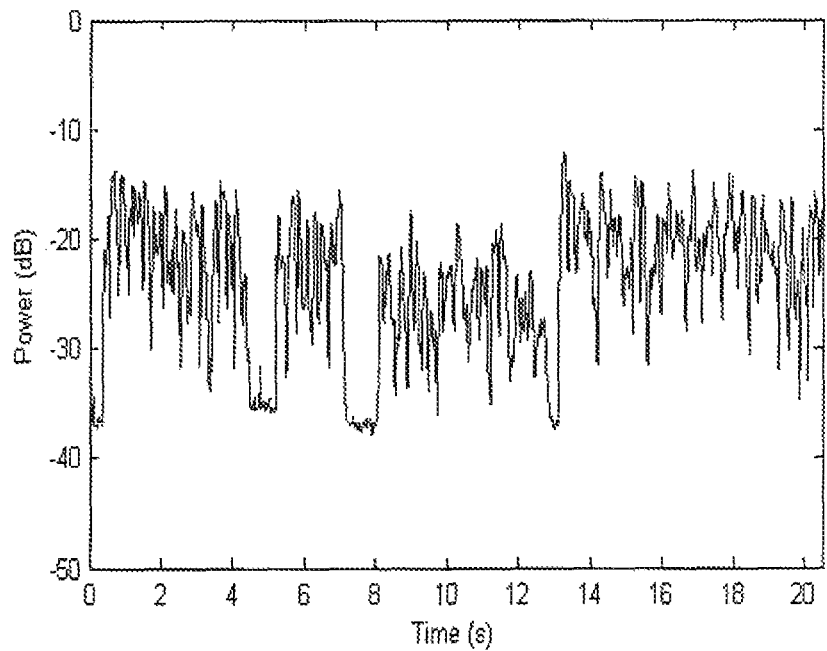
FIG. 12(a) is a schematic diagram of a power curve of a signal of a primary transmitter.
Figure 12B:
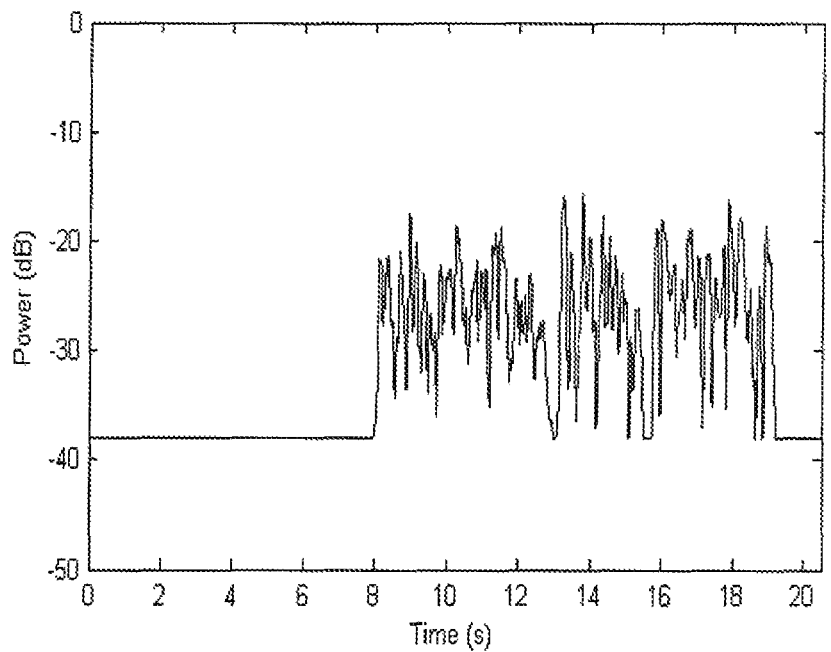
FIG. 12(b) is a schematic diagram of a power curve of a near-end voice component in a signal of a primary transmitter.
Figure 12C:
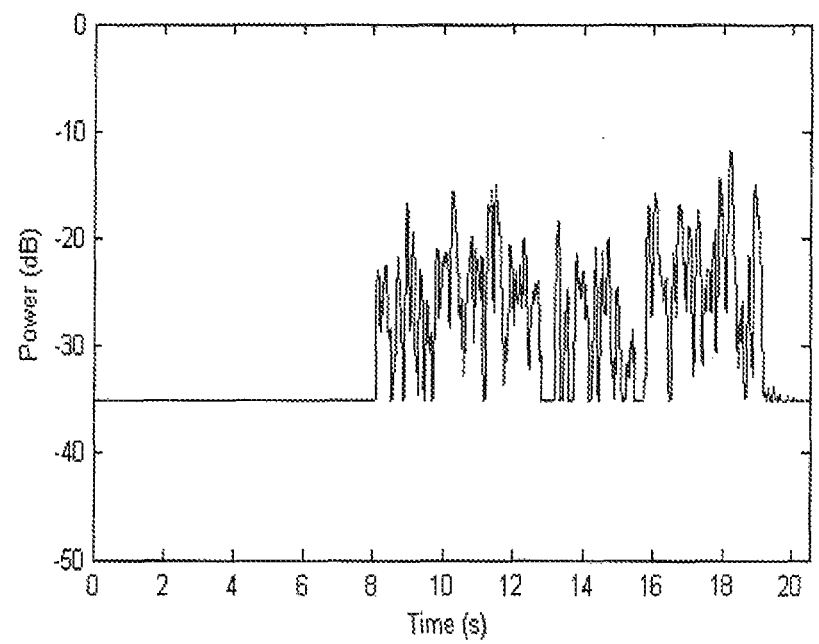
FIG. 12(c) is a schematic diagram of a power curve of an echo-eliminated output signal.

FIG. 6 is a block diagram of an echo elimination device for a miniature hands-free voice communication system provided by a preferred embodiment of the present invention, in a use state. FIG. 7 is a schematic diagram of a transfer function of each signal component from an auxiliary transmitter to a primary transmitter. FIG. 8 is a schematic diagram of power curves of a signal of the primary transmitter and an array-filtered output signal. FIG. 9 is a schematic diagram of power curves of an output signal of an array filter module and a first self-adaptive filter signal obtained by self-adaptive echo filtering. FIG. 10 is a schematic diagram of power curves of nonlinear echo components of a first self-adaptive filter signal and a second self-adaptive filter signal. FIG. 11 is a schematic diagram of a power curve of a nonlinear echo of the first self-adaptive filter signal and a power curve of a matched echo. FIG. 12(a) is a schematic diagram of a power curve of a signal of a primary transmitter. FIG. 12(b) is a schematic diagram of a power curve of a near-end voice component in a signal of a primary transmitter. FIG. 12(c) is a schematic diagram of a power curve of an echo-eliminated output signal.

The echo elimination device for a miniature hands-free voice communication system provided by the present invention consists of an array echo elimination unit 610, a self-adaptive echo elimination unit 620 and a residual echo elimination unit 630. The array echo elimination unit 610, the self-adaptive echo elimination unit 620 and the residual echo elimination unit 630 have a cascade relation in structure. The inputs of the array echo elimination unit 610 are a signal d1 of a primary transmitter and a signal d2 of an auxiliary transmitter. A path of output signal d1' is obtained by removing a part of linear echo component and a part of nonlinear echo component in the signal of the primary transmitter, by array filtering. The input signals of the self-adaptive echo elimination unit 620 are a signal x of the receiver, the output signal d1' of the array echo elimination unit 610 and a signal d2 of the auxiliary transmitter. Two paths of output signals e1 and e2 are obtained by removing from the output signal d1' of the array echo elimination unit 610 a residual linear echo component in the signal of the primary transmitter, and removing from the signal d2 of the auxiliary transmitter a linear echo component in the signal of the auxiliary transmitter, by self-adaptive filtering, respectively. The input signals of the residual echo elimination unit 630 are the two paths of output signals e1 and e2 from the self-adaptive echo elimination unit 620. By voice probability estimation and echo matching, a residual nonlinear echo component in the signal of the primary transmitter is removed and then an output signal, i.e., an echo-separated voice signal, is output after echo elimination. Processed by the array echo elimination unit 610, the self-adaptive echo elimination unit 620 and the residual echo elimination unit 630, the echo will be eliminated, while the near-end voice signal v will be reserved completely.

Specifically, the device includes an array filter module, two self-adaptive filter modules, two time-frequency transformation modules, a voice probability estimation module, a frequency spectrum filter module and a frequency-time transformation module.

The array filter module includes an array filter 611 and a subtractor 612. The array filter 611 is configured to perform array filtering to the signal d2 of the auxiliary transmitter to obtain a second array filter signal. The subtractor 612 is configured to subtract the second array filter signal from the signal d1 of the primary transmitter so as to remove a part of linear echo component and a part of nonlinear echo component in the signal of the primary transmitter and thus to obtain the output signal dr. The array filter has space directivity and may detect the sound emitted from the position of the receiver, and then a part of the sound emitted from the position of the receiver is eliminated by the subtractor. As both the linear echo component and the nonlinear echo component are emitted from the position of the receiver, a part of both the linear echo component and the nonlinear echo component will be removed after being processed by the array filter and the subtractor.

With respective to d1, the power of the echo component of d1' will be attenuated obviously, while the voice power does not change obviously. The principle is that, the receiver is close to the two transmitters in position and there is an obvious distance difference, while the near-end voice is far away from the two transmitters and has approximate distances. The transmission characteristics of the near-end voice and the echo to the transmitter are totally different, and this difference is reflected in transfer functions of the signals of the two transmitters. Through the difference between the transfer functions, the voice may be distinguished from the echo. The array filter 611 is designed according to the transfer function between the echo components, and the echo is removed by a manner of array filtering elimination, so that the near-end voice components will not be influenced.

It is assumed that $d_{echo1}$ is an echo component in the primary transmitter, $d_{sph1}$ is a near-end voice component in the signal of the primary transmitter, $d_{echo2}$ is an echo component in the auxiliary transmitter, $d_{sph2}$ is a near-end voice component in the signal of the auxiliary transmitter. The signals of the primary and auxiliary transmitters may be expressed as:

$$d_i = d_{echoi} + d_{sphi}, i=1,2 \qquad (1).$$

It is assumed that h is a transfer function between the echo components and hN is a transfer function between the near-end voice components, so a relational expression is:

$$d_{echo1} = d_{echo2} * h, d_{sph1} = d_{sph2} * hN \qquad (2).$$

If h is not equal to hN, and the array filer $\hat{h}$ approximate to h can be acquired, d1' is obtained by a manner of filtering elimination:

$$d_1' = d_1 - d_2 * \hat{h} \qquad (3).$$

In combination with the above formulae (1), (2) and (3), a relational expression of an echo component and a near-end voice component in d1' may be obtained:

$$d'_1 = d_{sph1} - d_{sph2} * \hat{h} \qquad (4)$$
$$= d_{echo1} - d_{echo2} * \hat{h} + d_{sph1} - d_{sph2} * \hat{h}$$
$$= d_{echo2} * (h - \hat{h}) + d_{sph2} * (\hat{h} - hN)$$
$$= d'_{echo1} + d'_{sph1}.$$

It can be found from the comparison of the formulae (1) and (4) that, if the following formulae (5) and (6) or the following formulae (5) and (7) are satisfied, the power of the echo component in d1' may be attenuated obviously, while the voice power will not change obviously, so that the purpose of reducing echo and protecting voice is achieved, wherein the formulae (6) and (7) are approximately equivalent forms:

$$E(h - \hat{h})^2 < E(h)^2 \qquad (5)$$

$$E(\hat{h} - hN)^2 >= E(hN)^2 \qquad (6)$$

$$E(\hat{h} \cdot hN) < \frac{E[\hat{h}^2]}{2}. \qquad (7)$$

If $\hat{h}$ is estimated accurately, the formula (5) may be satisfied. If $\hat{h}$ is totally different from hN at this time, $E(\hat{h} \cdot hN) \approx 0$ and the conditions of the formula (7) may be satisfied. Thus, it may be ensured that the echo is eliminated by array filtering, while the voice is not attenuated.

In the device shown in FIG. 1, as a ratio of D1 to D2 is large, for example, D1>2D2 and D1−D2>6 cm in this embodiment, a condition that h is totally different from hN is satisfied. Both h and hN are approximate to single-peak functions, where the width of a peak is about 0.25 ms, and the half width is about 0.125 ms. Due to the limitation of D1>2D2, the power difference between h and hN is above 6 dB, and the difference between the absolute values of peaks is more than two times. Due to the limitation of D1−D2>6 cm, the difference between the positions of the peaks of h and hN is above 0.17 ms which is more than the half-width of peak, so that the peaks are totally staggered in time. The transfer function of each signal component from the auxiliary transmitter to the primary transmitter may refer to FIG. 7. The transfer function h between the echo components is expressed by a solid line and is a single-peak curve, and the peak is at a position where the time delay is (D1−D2)/c, where c denotes the propagation velocity of sound in the air, with the maximum amplitude being approximately D2/D1. In the case of D1=13 cm and D2=4 cm, the height of the peak is about 0.3, and the position of the peak is at 0.26 ms. The transfer function hN between the near-end voice components is a curve expressed by a dotted line, and is approximate to a single-peak curve in shape. The peak is at 0 ms, and the height of the peak is 1. It can be seen that the two transfer functions are totally different.

In a real system, the transfer function $\hat{h}$ of the array filter may be calculated offline in advance and fixed. The more accurate calculation may employ the least-mean-square-error criterion, as shown in formula (8), where $\hat{h}$ denotes the transfer function of the array filter, $d_1$ denotes the signal of the primary transmitter, $d_2$ denotes the signal of the auxiliary transmitter, E[.] denotes an expectation operation, and * denotes a convolution operation:

$$\frac{\partial E[(d_1 - d_2 * \hat{h})^2]}{\partial \hat{h}} = 0 \qquad (8)$$

The output d1' of the array filter module 610 is expressed by formula (3). By taking D1=13 cm and D2=4 cm as example, the effect of array echo elimination may refer to FIG. 8, where the solid line represents a power curve of the signal d1 of the primary transmitter, while the dashed line represents a power curve of the output d1' of the array filter module. It can be seen that the echo power change results in about 9 dB of average power reduction.

The two self-adaptive filter modules both include a filter 621, a filter controller 622 and a subtractor 623, and are configured to perform, respectively, self-adaptive filtering to the signal d2 of the auxiliary transmitter, to obtain a second self-adaptive filter signal e2 so as to remove the linear echo component in the signal of the auxiliary transmitter, and perform self-adaptive filtering to the signal d1' obtained by subtracting the second array filter signal from the signal of the primary transmitter to obtain a first self-adaptive filter signal e1 so as to remove the residual linear echo component in the signal of the primary transmitter.

The self-adaptive echo elimination unit has three paths of inputs, i.e., the signal x of the receiver, the signal d2 of the auxiliary transmitter and the output signal d1' of the array filter module. The outputs are the first self-adaptive filter signal e1 and the second self-adaptive filter signal e2 after self-adaptive filtering. The working principle of this part is similar to that of the universal self-adaptive echo filtering, and may employs time domain or frequency domain filtering. By comparing the similarity of the signal x of the receiver, d2 and d1', an echo signal is obtained by self-adaptively matching and then removed from d2 and d1'. The effect may refer to FIG. 9, where the solid line represents a power curve of the output d1' of the array filter module, while the dashed line represents a power curve of the result of self-adaptive echo filtering, i.e., the first self-adaptive filter signal e1. It can be seen that the power changes, and the power of e1 is average about 5 dB less than that of d1' in an echo region.

The two time-frequency transformation modules both include a data buffer 631 and a time-frequency transformer 632, and are configured to perform, respectively, time-frequency transformation to the first self-adaptive filter signal e1 to obtain a first self-adaptive frequency domain signal E1, and time-frequency transformation to the second self-adaptive filter signal e2 to obtain a second self-adaptive frequency domain signal E2.

The data buffers 631 are used for composing signals into signal vectors for allowing the time-frequency transformers 632 to use. The lengths of the data buffers 631 are set as L and related to computational resources, and may be set as 256 or 512 generally. If the input signals are e1(n) and e2(n) at the current moment n, the vectors formed in the two data buffers 631 are [e1(n−L+1), e1(n−L+2) ... e1(n)] and [e2(n−L+1), e2(n−L+2) ... e2(n)], respectively.

The time-frequency transformers 632 transform the signals from time domain into frequency domain. The transformation may be realized by Fourier transform, improved discrete digital cosine transform or other ways. By taking the Fourier transform as example, the frequency domain signals are:

$$E_1(k) = \sum_{m=1}^{L} e_1(n - L + m) W^{k(m-1)}, \; W = \exp\left(-j\frac{2\pi}{M}\right)$$

$$E_2(k) = \sum_{m=1}^{L} e_2(n - L + m) W^{k(m-1)}, \; W = \exp\left(-j\frac{2\pi}{M}\right).$$

The voice probability estimation module 633 is configured to perform frequency domain voice probability estimation according to the amplitude of the first self-adaptive frequency domain signal E1 and the amplitude of the second self-adaptive frequency domain signal E2 to obtain a frequency domain voice probability signal pF, the frequency domain voice probability signal pF representing a proportion of a near-end voice signal in the first self-adaptive frequency domain signal E1. This is because:

The voice probability estimation module 633 acquires the frequency domain voice probability information pF by comparing the amplitude relation of the two paths of signals, where pF is a time-frequency function and represents a proportion of voice and echo in each time-frequency region. If pF is 1, it is indicated that there are all near-end voice signals in this region. If pF is 0, it is indicated that there are all echo signals in this region. If pF is a value from 0 to 1, it is indicated that there are near-end voice signals and echo signals in this region. If pF is approximate to 1, it is indicated that the proportion of the near-end voice is large. If pF is approximate to 0, it is indicated that the proportion of the near-end voice is low.

The working principle of the voice probability estimation is as follows: two paths of input signals E1 and E2 of the voice probability estimation module 633 both contains nonlinear echo components and near-end voice signals, where the power of the nonlinear echo component in E1 is low, while the power of the nonlinear echo component in E2 is about 20 dB higher than that of the nonlinear echo component in E1. Therefore, in a time-frequency region where the echo is located, the amplitude of E2 is much higher that of E1. However, in a time-frequency region where the near-end voice is located, the power of E1 is approximate to that of E2. By comparing the amplitude of E1 with the amplitude of E2 at each frequency point, the distribution of the nonlinear echo components and the near-end voice on a frequency may be known.

The specific implementation method of this embodiment is as follows: calculating an amplitude ratio of E1 to E2, and acquiring a voice probability according to the mapping relation:

$$pF(f) = \begin{cases} 1 & |E_2/E_1| < T_S \\ (T_E - |E_2/E_1|)/(T_E - T_S) & |E_2/E_1| \in [T_S, T_E], \\ 0 & |E_2/E_1| > T_E \end{cases}$$

where $T_S$ denotes an average amplitude difference between voice components in the signals of the two transmitters, and $T_E$ denotes an average amplitude difference of echo components in the signals of the two transmitters. After voice probability judgment, the voice probability on each frequency point may be calculated, where f denotes a frequency.

The values of $T_S$ and $T_E$ are related to a structure. By taking the structure shown in FIG. 1 as example, $T_S$=1.4, where 1.4 is corresponding to 3 dB and represents an amplitude difference between the near-end voice components received by the two transmitters. This value is the sensitivity tolerance of transmitters of the same type in the industrial production. If D1=13 cm and D2=4 cm, $T_E$=4. 4 is the approximate value of the average amplitude ratio of the echo components in the two transmitters, and the average amplitude ratio of the echo components is about (D1/D2)×1.4. When the echo is spread to the two transmitters, the amplitude difference between the echo signals is D1/D2, then multiplied by the sensitivity tolerance 1.4, and rounded down so as to obtain 4. 2.6 is a difference between $T_S$ and $T_E$, and is designed for making the function curve continuous. The meaning of this formula is that, when the amplitude difference of the signals is within 1.4, i.e., no more than the sensitivity tolerance, it is very likely to be the voice components, and the voice probability is 1. When the amplitude difference of the signals is more than 4 and is approximate to the amplitude difference of the echo components, it is very likely to be the echo components, and the voice probability is 0. The middle part is fitted by a linear slope curve, so the probability value is lower if the amplitude difference is closer to 4.

The calculation mode is:

$$pF(f) = \begin{cases} 1 & |E_2/E_1| < 1.4 \\ (4 - |E_2/E_1|)/2.6 & |E_2/E_1| \in [1.4, 4] \\ 0 & |E_2/E_1| > 4 \end{cases}$$

The frequency spectrum filter module includes an echo matcher 634, a subtractor 635 and a multiplier 636. The echo matcher 634 is configured to perform echo matching according to the power of the nonlinear echo component of the first self-adaptive frequency domain signal E1 and the power of the nonlinear echo component of the second self-adaptive frequency domain signal E2 to obtain a matched echo. The subtractor 635 is configured to subtract the matched echo from the first self-adaptive frequency domain signal E1. The multiplier 636 is configured to multiply the result of subtraction by the frequency domain voice probability signal pF.

The echo matcher 634 may estimate nonlinear echo components and linear echo components from a frequency spectrum according to the interrelation between the nonlinear echo components and the linear echo components in the signals of the two transmitters, and then suppress them by filtering. The nonlinear echo components and the linear echo components are generated by the receiver and propagated to the primary transmitter and the auxiliary transmitter. The nonlinear echo components and the linear echo components in the signal d1 of the primary transmitter and the signal d2 of the auxiliary transmitters have high similarity. This similarity is mainly embodied as the consistency of spectrum peak positions of the nonlinear echo components and the linear echo components. As almost all power of the nonlinear echo components and the linear echo components are concentrated in the spectrum peaks, it can be considered that the frequency distribution rules of the nonlinear echo components and the linear echo components are consistent if the positions of the spectrum peaks are consistent. If the spectrum peaks of the nonlinear echo components and the linear echo components are suppressed, majority of the nonlinear echo components and the linear echo components may be removed. Both the array echo elimination unit 610 and the self-adaptive echo elimination unit 620 perform linear filtering only, so that only the amplitude of the nonlinear echo components, the amplitude of the linear echo components and the enveloping shape of the frequency spectrum are changed, but the positions of the spectrum peaks are not changed, that is, the similarity relation of the nonlinear echo components and the linear echo components is still reserved. Therefore, in the first self-adaptive frequency domain signal E1 and the second self-adaptive frequency domain signal E2, the positions of the spectrum peaks of the nonlinear echo components are highly approximate. It can be seen from the frequency spectrum shown in FIG. 10 that, the peak value positions of the nonlinear echo components and the linear echo components in E1 and E2 are identical or similar, except that the overall fluctuation shape and the signal power are different.

Therefore, overall outline matching may be performed to the nonlinear and linear echo components of E1 and E2 to obtain the matched echo, and then the matched echo is multiplied by a certain factor Ag for amplitude matching to obtain an amplitude-matched echo. The factor Ag declines with the rise of the voice probability pF. Thus, in a time-frequency region having lower voice probability and higher echo probability, the amplitude of the matched echo is higher than that of the nonlinear and linear echo components; and, in a region having higher voice probability and lower echo probability, the amplitude obtained after multiplying the matched echo by Ag is equal to or slightly lower than that of the nonlinear and linear echo components. By subtracting the amplitude-matched echo from the first self-adaptive frequency domain signal E1, the residual echo may be removed.

Generally, to completely remove the residual echo, the stronger the residual echo is, the larger the Ag is, and the higher the intensity of the frequency spectrum filtering is. But, at this time, the damage to the near-end voice is also larger. In addition, the interference of the residual echo to communication in pure echo is different from that in a double-taking. When in pure echo, a person is very sensitive to the residual echo, and little residual echo will also discomfort the person. However, in a double-taking region having echo and near-end voice, a person is not sensitive to the residual echo, but the quality of the near-end voice is highly required. In the present invention, due to the use of the voice probability estimation module, by a method combining voice probability estimation with echo matching, the value of the matched echo may be small, weaker frequency spectrum filtering may remove nonlinear and linear echo components, and the strength of frequency spectrum filtering changes with the near-end voice probability. When the near-end voice probability is higher, the intensity of frequency spectrum filtering is reduced, to better protect the near-end voice. Thus, dynamically adjusting the filtering intensity along with the voice probability may enhance the comfort level and voice quality, so that the near-end voice may be betted reserved.

The process of frequency spectrum filtering is: performing amplitude matching to the signal E2 and the echo signal in E1. The amplitude matching may be performed in such a way: dividing a full frequency into M subbands with subband boundaries of $B_1$–$B_{M+1}$. In this embodiment, M may be 32 or 16. The power of each subband of E1 and E2 is acquired, and then division and evolution are performed to the power to obtain a matching function $H_m$·$E_2$ is multiplied by the matching function $H_m$ and then multiplied by a factor Ag to obtain a matched echo $Y_m$.

The matching effect may refer to FIG. 11. It can be seen that, within a frequency range where the echo is located, the matched echo $Y_m$ is approximate to the echo component of E1 (the differences at 300 Hz and 3800 Hz are caused by the background noise, but are not matching errors).

The method for calculating the matching function is as shown in the following formula:

$$H_m(f) = \sqrt{\frac{\sum_{k=B_1}^{k=B_{i+1}} E_1^2(k)}{\sum_{k=B_1}^{k=B_{i+1}} E_2^2(k)}} , B_{i+1} > f \geq B_i,$$

where i∈[1,M] denotes a subband number, f denotes the frequency, k denotes a frequency sampling point in a subband, $E_1(k)$ denotes the amplitude of the first self-adaptive frequency domain signal at the frequency sampling point, and $E_2(k)$ denotes the amplitude of the second self-adaptive frequency domain signal at the frequency sampling point.

The second self-adaptive frequency domain signal $E_2$ is multiplied by the matching function $H_m$ and then multiplied by a factor Ag for amplitude matching, to obtain a matched echo $Y_m$:

$$Y_m(f)=Ag(f)·E_2(f)H_m(f)$$

After the echo matching and voice probability estimation, E1 subtracts the matched echo $Y_m$, and then multiplied by the voice probability function pF to obtain a result as follows:

$$E_{out}(f)[E_1(f)-Y_m(f)]·pF(f)$$

The frequency-time transformation module 637 is configured to perform frequency-time transformation to the result of multiplication. The frequency-time transformation module 637 transforms a digital signal from a frequency domain into a time domain. The transformation may be realized by inverse Fourier transform, inverse discrete digital cosine transform or other ways.

After the frequency-time transformation, a frequency domain signal Eout is transformed into a time domain signal eout as a total output of the system.

The final effect may refer to the signal d1 of the primary transmitter in FIG. 12(a), the near-end voice component in the signal d1 of the primary transmitter in FIG. 12(b), and the power curve of eout in FIG. 12(c). It can be seen that the echo components in the eout are all eliminated, and the near-end voice is completely reserved, and the signal power is not attenuated obviously in comparison to that of the original near-end voice component, thereby meeting the full-duplex requirements.

Figure 13:
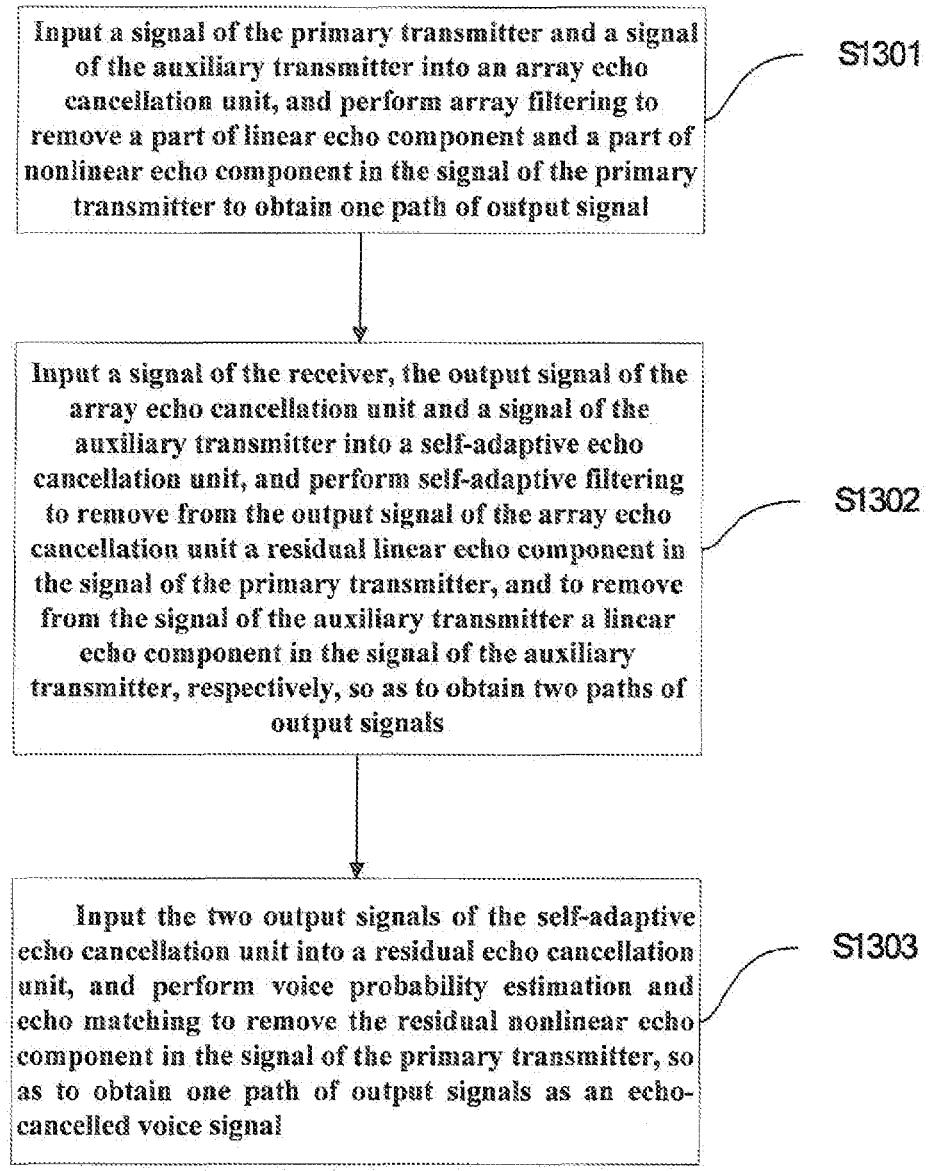
FIG. 13 is a flowchart of an echo elimination method for a miniature hands-free voice communication system according to a preferred embodiment of the present invention.

FIG. 13 is a flowchart of an echo elimination method for a miniature hands-free voice communication system according to a preferred embodiment of the present invention. The miniature hands-free voice communication system includes a receiver, a primary transmitter and an auxiliary transmitter. A distance from the primary transmitter to the receiver is greater than that from the auxiliary transmitter to the receiver. The method includes the following steps of:

S1301: inputting a signal of the primary transmitter and a signal of the auxiliary transmitter into an array echo elimination unit, performing array filtering to remove a part of linear echo component and a part of nonlinear echo component in the signal of the primary transmitter to obtain one path of output signal;

S1302: inputting a signal of the receiver, the output signal of the array echo elimination unit and a signal of the auxiliary transmitter into a self-adaptive echo elimination unit, performing self-adaptive filtering to remove from the output signal of the array echo elimination unit a residual linear echo component in the signal of the primary transmitter, and to remove from the signal of the auxiliary transmitter a linear echo component in the signal of the auxiliary transmitter, respectively, so as to obtain two paths of output signals; and S1303: inputting the two paths of output signals of the self-adaptive echo elimination unit into a residual echo elimination unit, performing voice probability estimation and echo matching to remove the residual nonlinear echo component in the signal of the primary transmitter, so as to obtain one path of output signals as an echo-eliminated voice signal.

Figure 14:
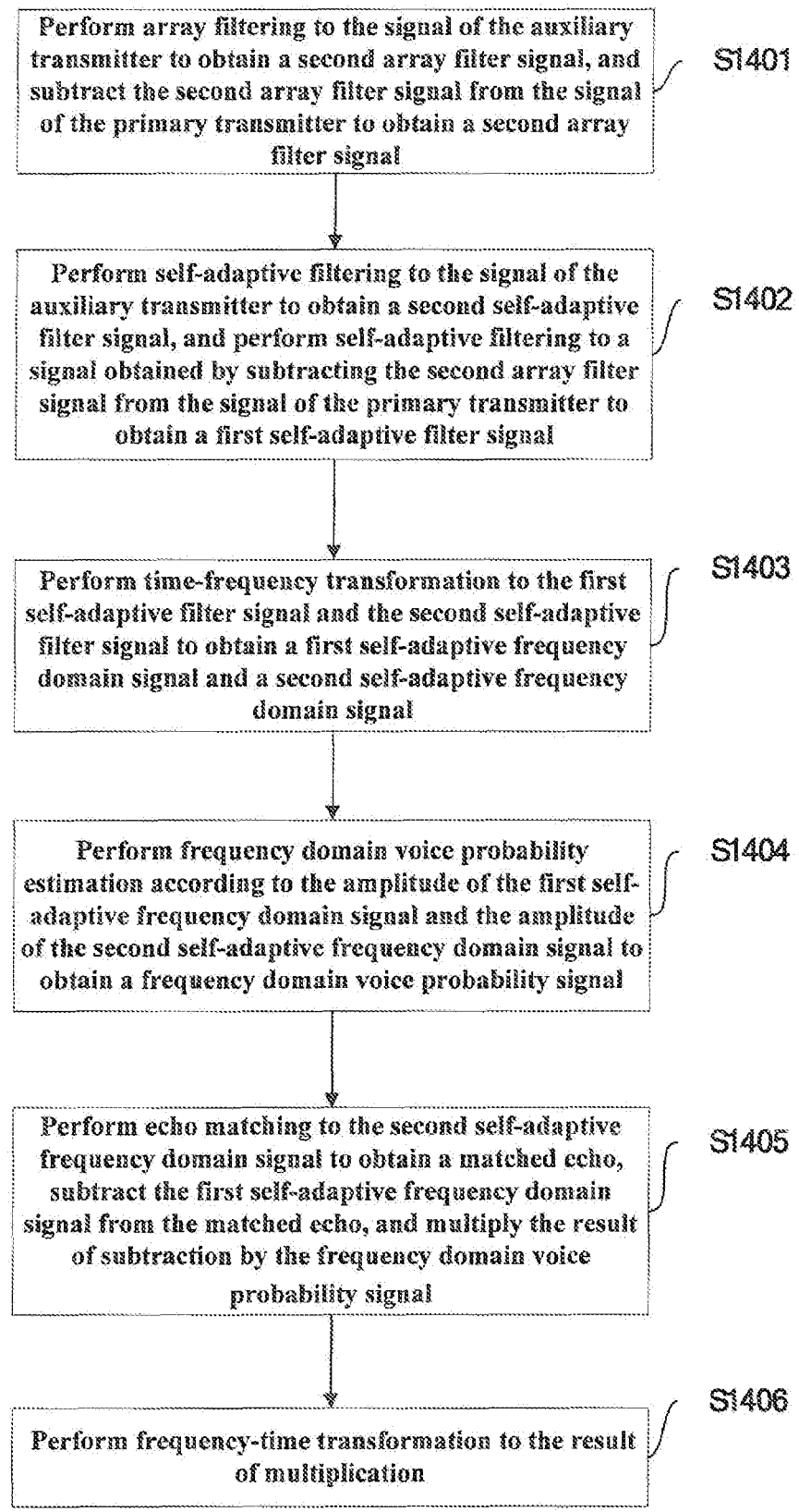
FIG. 14 is a detailed flowchart of an echo elimination method for a miniature hands-free voice communication system according to a preferred embodiment of the present invention.

FIG. 14 is a detailed flowchart of an echo elimination method for a miniature hands-free voice communication system according to a preferred embodiment of the present invention. The miniature hands-free voice communication system includes a receiver, a primary transmitter and an auxiliary transmitter. A distance from the primary transmitter to the receiver is greater than that from the auxiliary transmitter to the receiver. The method includes the following steps of:

S1401: performing array filtering to the signal of the auxiliary transmitter to obtain a second array filter signal, and subtracting the second array filter signal from the signal of the primary transmitter to remove a part of linear echo component and a part of nonlinear echo component in the signal of the primary transmitter;

S1402: performing self-adaptive filtering to the signal of the auxiliary transmitter to remove the linear echo component in the signal of the auxiliary transmitter so as to obtain a second self-adaptive filter signal, and performing self-adaptive filtering to a signal obtained by subtracting the second array filter signal from the signal of the primary transmitter to remove the residual linear echo component in the signal of the primary transmitter so as to obtain a first self-adaptive filter signal;

S1403: performing time-frequency transformation to the first self-adaptive filter signal and the second self-adaptive filter signal to obtain a first self-adaptive frequency domain signal and a second self-adaptive frequency domain signal;

S1404: performing frequency domain voice probability estimation according to the amplitude of the first self-adaptive frequency domain signal and the amplitude of the second self-adaptive frequency domain signal to obtain a frequency domain voice probability signal, the frequency domain voice probability signal representing a proportion of a near-end voice signal in the first self-adaptive frequency domain signal;

S1405: performing echo matching to the second self-adaptive frequency domain signal according to the amplitude of the nonlinear echo component of the first self-adaptive frequency domain signal and the amplitude of the nonlinear echo component of the second self-adaptive frequency domain signal to obtain a matched echo, subtracting the matched echo from the first self-adaptive frequency domain signal, and multiplying the result of subtraction by the frequency domain voice probability signal; and S1406: performing frequency-time transformation to the result of multiplication to output a result of echo elimination.

Specifically, in Step 1401, the performing array filtering to the signal of the auxiliary transmitter to obtain a second array filter signal specifically includes: determining a transmission function $\hat{h}$ of an array filter, and performing array filtering to the signal of the auxiliary transmitter by an array filter using the transmission function $\hat{h}$, where the transmission function $\hat{h}$ of the array filter is determined according to the following formula:

$$\frac{\partial E\left[(d_1 - d_2 * \hat{h})^2\right]}{\partial \hat{h}} = 0,$$

where $\hat{h}$ denotes the transmission function of the array filter, $d_1$ denotes the signal of the primary transmitter, $d_2$ denotes the signal of the auxiliary transmitter, $E[.]$ denotes an expectation operation symbol, and $*$ denotes a convolution operation symbol.

In Step 1404, the performing frequency domain voice probability estimation according to the amplitude of the first self-adaptive frequency domain signal and the amplitude of the second self-adaptive frequency domain signal to obtain a frequency domain voice probability signal includes:

calculating a frequency domain voice probability signal according to the following formula:

$$pF(f) = \begin{cases} 1 & |E_2/E_1| < T_S \\ (T_E - |E_2/E_1|)/(T_E - T_S) & |E_2/E_1| \in [T_S, T_E], \\ 0 & |E_2/E_1| > T_E \end{cases}$$

where f denotes the frequency, $E_1$ denotes the amplitude of the first self-adaptive frequency domain signal, $E_2$ denotes the amplitude of the second self-adaptive frequency domain signal, pF denotes the frequency domain voice probability signal, $T_S$ denotes an average amplitude ratio of near-end voice signals in the signal of the auxiliary transmitter and the signal of the primary transmitter, and $T_E$ denotes an average amplitude ratio of nonlinear echo component signals in the signal of the auxiliary transmitter and the signal of the primary transmitter, wherein $T_E > T_S > 1$.

In Step 1405, the performing echo matching to the second self-adaptive frequency domain signal according to the power of the nonlinear echo component of the first self-adaptive frequency domain signal and the power of the nonlinear echo component of the second self-adaptive frequency domain signal specifically includes the following two steps of:

(1) dividing a full frequency into M subbands with subband boundaries of $B_1 - B_{M+1}$, acquiring, in each of the subbands, the power of the first self-adaptive frequency domain signal $E_1$ and the power of the second self-adaptive frequency domain signal $E_2$, and performing division and evolution to the power to obtain a matching function $H_m$:

$$H_m(f) = \sqrt{\frac{\sum_{k=B_1}^{k=B_{i+1}} E_1^2(k)}{\sum_{k=B_1}^{k=B_{i+1}} E_2^2(k)}}, B_{i+1} > f \geq B_i,$$

where $i \in [1, M]$ denotes a subband number, f denotes a frequency, k denotes a frequency sampling point in a subband, $E_1(k)$ denotes the amplitude of the first self-adaptive frequency domain signal at the frequency sampling point, and $E_2(k)$ denotes the amplitude of the second self-adaptive frequency domain signal at the frequency sampling point; and (2) multiplying the second self-adaptive frequency domain signal $E_2$ by the matching function $H_m$ and then by a factor Ag for amplitude matching so as to obtain a matched echo $Y_m$:

$$Y_m(f)=Ag(f) \cdot E_2(f) H_m(f)$$

In Step 1405, subtracting the matched echo $Y_m$ from the first self-adaptive frequency domain signal, and then multiplying the result of subtraction by the frequency domain voice probability signal are:

$$E_{out}(f)=[E_1(f)-Y_m(f)] \cdot pF(f)$$

where pF denotes a frequency domain voice probability signal, and Ag denotes a factor related to pF and declines with the increase of pF, for example, Ag may be Ag(f)=max[2−pF(f)*2.5,0].

When pF is close to 0, Ag is greater than 1, so that the amplitude of both the matched echo and Ag is higher than that of the nonlinear echo component of the first self-adaptive frequency domain signal $E_1$, and the echo may be thus eliminated. When pF is close to 1, Ag is a numerical value smaller than 1, so that the amplitude of the matched echo is lower than that of the nonlinear echo component of the first self-adaptive frequency domain signal $E_1$, and the voice may be reserved. In other words, the matched echo is approximate to the residual nonlinear echo component in the first self-adaptive frequency domain signal, so the nonlinear echo component in the first self-adaptive frequency domain signal is almost subtracted completely after subtraction, but there may also weak residuals; and by multiplying the result of subtraction by the voice probability, the nonlinear echo component may be removed completely.

The embodiments of the present invention have the following advantages:

(1) in the technical solutions of the present invention, by using voice probability estimation in combination with echo matching, the damage to the near-end voice may be relieved and the duplex performance is enhanced while reducing echo;

(2) for a miniature hands-free voice communication system with a plurality of transmitters, the technical solutions of the present invention may be implemented only by a farthest transmitter and a nearest transmitter to a receiver, so it is easy to implement;

(3) the technical solutions of the present invention do not need to distinguish the phase of the voice, so the phase consistency of the transmitters is not required strictly, there are few limitations to an acoustic design, and it is easy to design products; and (4) the frequency domain voice probability signal is applied in the operation of the echo matching, so that the strength of frequency spectrum filtering changes with the near-end voice probability; and when the near-end voice probability is relatively high, the intensity of frequency spectrum filtering is reduced, so that the near-end voice may be better protected.

In conclusion, the forgoing description shows merely the specific embodiments of the present invention, and is not intended to limit the protection scope of the present invention. Any variation or replacement, which may be readily made by any person of skill in the art within the technical scope of the present invention, shall fall into the protection scope of the present invention. Therefore, the protection scope pf the present invention should be subject to the protection scope of the appended claims.

The invention claimed is:

1. An echo elimination device for a miniature hands-free voice communication system, wherein the miniature hands-free voice communication system comprises a receiver, a primary transmitter and an auxiliary transmitter, a distance from the primary transmitter to the receiver being greater than that from the auxiliary transmitter to the receiver, wherein the device comprises an array echo elimination unit, a self-adaptive echo elimination unit and a residual echo elimination unit, which are structurally cascaded in turn, the array echo elimination unit, with inputs being a signal of the primary transmitter and a signal of the auxiliary transmitter, removes a part of linear echo component and a part of nonlinear echo component in the signal of the primary transmitter, by array filtering, so as to obtain one path of output signals;

the self-adaptive echo elimination unit, with the input signals being a signal of the receiver, the output signal of the array echo elimination unit and a signal of the auxiliary transmitter, removes from the output signal of the array echo elimination unit a residual linear echo component in the signal of the primary transmitter, and removes from the signal of the auxiliary transmitter a linear echo component in the signal of the auxiliary transmitter, by self-adaptive filtering, respectively, so as to obtain a first self-adaptive filter signal and a second self-adaptive filter signal; and the residual echo elimination unit, with the input signals being the first self-adaptive filter signal and second self-adaptive filter signal of the self-adaptive echo elimination unit, removes a residual nonlinear echo component in the signal of the primary transmitter, by voice probability estimation and echo matching, so as to obtain one path of output signals as an echo-eliminated voice signal;

wherein, the residual echo elimination unit comprises two time-frequency transformation modules, a voice probability estimation module, a frequency spectrum filter module and a frequency-time transformation module, the two time-frequency transformation modules being configured to perform, respectively, time-frequency transformation to the first self-adaptive filter signal to obtain a first self-adaptive frequency domain signal, and time-frequency transformation to the second self-adaptive filter signal to obtain a second self-adaptive frequency domain signal;

the voice probability estimation module is configured to perform frequency domain voice probability estimation according to the amplitude of the first self-adaptive frequency domain signal and the amplitude of the second self-adaptive frequency domain signal to obtain a frequency domain voice probability signal, the frequency domain voice probability signal representing a proportion of a near-end voice signal in the first self-adaptive frequency domain signal;

the frequency spectrum filter module comprises an echo matcher, a subtractor and a multiplier, the echo matcher being configured to perform echo matching to the second self-adaptive frequency domain signal according to the amplitude of the first self-adaptive frequency domain signal and the amplitude of the second self-adaptive frequency domain signal, the subtractor being configured to subtract the result of echo matching from the first self-adaptive frequency domain signal to remove the nonlinear echo component signal, the multiplier being configured to multiply the result of subtraction by the frequency domain voice probability signal to suppress the echo signal and protect the near-end voice signal; and the frequency-time transformation module is configured to perform frequency-time transformation to the result of multiplication to output a result of echo elimination.

2. The device according to claim 1, wherein,
the array echo elimination unit comprises an array filter module, the array filter module comprising an array filter a id a subtractor, the array filter being configured to perform array filtering to the signal of the auxiliary transmitter to obtain a second array filter signal, the subtractor being configured to subtract the second array filter signal from the signal of the primary transmitter so as to remove a part of linear echo component and a part of nonlinear echo component in the signal of the primary transmitter;
the self-adaptive echo elimination unit comprises two self-adaptive filter modules, the two self-adaptive filter modules being configured to perform, respectively, self-adaptive filtering to the signal of the auxiliary transmitter, to obtain a second self-adaptive filter signal so as to remove the linear echo component in the signal of the auxiliary transmitter, and self-adaptive filtering to a signal obtained by subtracting the second array filter signal from the signal of the primary transmitter to obtain a first self-adaptive filter signal so as to remove the residual linear echo component in the signal of the primary transmitter.

3. The device according to claim 2, wherein $D1 > 2D2$ and $D1 - D2 > 6$ cm;

where D1 denotes the distance from the primary transmitter to the receiver, and D2 denotes the distance from the auxiliary transmitter to the receiver;
a transmission function of the array filter is determined by the following formula:

$$\frac{\partial E\left[(d_1 - d_2 * \hat{h})^2\right]}{\partial \hat{h}} = 0,$$

where $\hat{h}$ denotes the transmission function of the array filter, $d_1$ denotes the signal of the primary transmitter, $d_2$ denotes the signal of the auxiliary transmitter, E[.] denotes an expectation operation symbol, and * denotes a convolution operation symbol.

4. The device according to claim 2, wherein the voice probability estimation module is configured to calculate a frequency domain voice probability signal according to the following formula:

$$pF(f) = \begin{cases} 1 & |E_2/E_1| < T_S \\ (T_E - |E_2/E_1|)/(T_E - T_S) & |E_2/E_1| \in [T_S, T_E] \\ 0 & |E_2/E_1| > T_E \end{cases}$$

where f denotes the frequency, $E_1$ denotes the amplitude of the first self-adaptive frequency domain signal, $E_2$ denotes the amplitude of the second self-adaptive frequency domain signal, pF denotes the frequency domain voice probability signal, $T_S$ denotes an average amplitude ratio of near-end voice signals in the signal of the auxiliary transmitter and the signal of the primary transmitter, and $T_E$ denotes an average amplitude ratio of nonlinear echo component signals in the signal of the auxiliary transmitter and the signal of the primary transmitter, where $T_E > T_S > 1$.

5. The device according to claim 2, wherein,
the echo matcher is configured to divide a full frequency into M subbands with subband boundaries of $B_1$–$B_{M+1}$, and then perform the following calculation in each of the subbands:
calculating a matching function $H_m$:

$$H_m(f) = \sqrt{\frac{\sum_{k=B_1}^{k=B_{i+1}} E_1^2(k)}{\sum_{k=B_1}^{k=B_{i+1}} E_2^2(k)}}, B_{i+1} > f \geq B_i,$$

where i∈[1,M] denotes a subband number, f denotes the frequency, k denotes a frequency sampling point in a subband, $E_1(k)$ denotes the amplitude of the first self-adaptive frequency domain signal at the frequency sampling point, and $E_2(k)$ denotes the amplitude of the second self-adaptive frequency domain signal at the frequency sampling point;
the second self-adaptive frequency domain signal $E_2$ is multiplied by the matching function $H_m$ and then multiplied by a factor Ag for amplitude matching, to obtain a matched echo $Y_m$:

$Y_m(f) = Ag(f) \cdot E_2(f) H_m(f);$ the subtractor subtracts the matched echo $Y_m$ from the first self-adaptive frequency domain signal, and then the multiplier multiplies the result of subtraction by the frequency domain voice probability signal:

$E_{out}(f) = [E_1(f) - Y_m(f)] \cdot pF(f),$ where pF denotes the frequency domain voice probability signal, and Ag denotes a factor related to pF and declines with the increase of pF.

6. An echo elimination method for a miniature hands-free voice communication system, wherein the miniature hands-free voice communication system comprises a receiver, a primary transmitter and an auxiliary transmitter, a distance from the primary transmitter to the receiver being greater than that from the auxiliary transmitter to the receiver, wherein the method comprises the following steps of:
inputting a signal of the primary transmitter and a signal of the auxiliary transmitter into an array echo elimination unit, performing array filtering to remove a part of linear echo component and a part of nonlinear echo component in the signal of the primary transmitter to obtain one path of output signals;
inputting a signal of the receiver, the output signal of the array echo elimination unit and a signal of the auxiliary transmitter into a self-adaptive echo elimination unit, performing self-adaptive filtering to remove from the output signal of the array echo elimination unit a residual linear echo component in the signal of the primary transmitter, and to remove from the signal of the auxiliary transmitter a linear echo component in the signal of the auxiliary transmitter, respectively, so as to obtain a first self-adaptive filter signal and a second self-adaptive filter signal; and
inputting the first self-adaptive filter signal and a second self-adaptive filter signal of the self-adaptive echo elimination unit into a residual echo elimination unit, performing voice probability estimation and echo matching to remove the residual nonlinear echo component in the signal of the primary transmitter, so as to obtain one path of output signals as an echo-eliminated voice signal;

the performing voice probability estimation and echo matching to remove the residual nonlinear echo component in the signal of the primary transmitter to obtain one path of output signals as an echo-eliminated voice signal specifically comprises: performing time-frequency transformation to the first self-adaptive filter signal and the second self-adaptive filter signal to obtain a first self-adaptive frequency domain signal and a second self-adaptive frequency domain signal, respectively; performing voice probability estimation according to the amplitude of the first self-adaptive frequency domain signal and the amplitude of the second self-adaptive frequency domain signal to obtain a frequency domain voice probability signal, the frequency domain voice probability signal representing a proportion of a near-end voice signal in the first self-adaptive frequency domain signal; performing echo matching to the second self-adaptive frequency domain signal according to the amplitude of the first self-adaptive frequency domain signal and the amplitude of the second self-adaptive frequency domain signal to obtain a matched echo, subtracting the matched echo from the first self-adaptive frequency domain signal to remove the nonlinear echo component signal, multiplying the result of subtraction by the frequency domain voice probability signal to suppress the echo signal and protect the near-end voice signal; and performing frequency-time transformation to the result of multiplication to output a result of echo elimination.

7. The method according to claim 6, wherein, the performing array filtering specifically comprises: performing array filtering to the signal of the auxiliary transmitter to obtain a second array filter signal, subtracting the second array filter signal from the signal of the primary transmitter to remove a part of linear echo component and a part of nonlinear echo component in the signal of the primary transmitter;

the performing self-adaptive filtering specifically comprises: performing self-adaptive filtering to the signal of the auxiliary transmitter to remove the linear echo component in the signal of the auxiliary transmitter so as to obtain a second self-adaptive filter signal, and performing self-adaptive filtering to a signal obtained by subtracting the second array filter signal from the signal of the primary transmitter to remove the residual linear echo component in the signal of the primary transmitter so as to obtain a first self-adaptive filter signal.

8. The method according to claim 7, wherein, $D1 > 2D2$ and $D1 - D2 > 6$ cm;

where D1 denotes the distance from the primary transmitter to the receiver, and D2 denotes the distance from the auxiliary transmitter to the receiver;

the performing array filtering to the signal of the auxiliary transmitter to obtain a second array filter signal specifically comprises: determining a transmission function of the array filter according to the following formula:

$$\frac{\partial E\left[(d_1 - d_2 * \hat{h})^2\right]}{\partial \hat{h}} = 0,$$

where $\hat{h}$ denotes the transmission function of the array filter, $d_1$ denotes the signal of the primary transmitter, $d_2$ denotes the signal of the auxiliary transmitter, E[.] denotes an expectation operation symbol, and * denotes a convolution operation symbol; and performing array filtering to the signal of the auxiliary transmitter by an array filter using the transmission function $\hat{h}$.

9. The method according to claim 7, wherein the performing voice probability estimation according to the amplitude of the first self-adaptive frequency domain signal and the amplitude of the second self-adaptive frequency domain signal to obtain a frequency domain voice probability signal specifically comprises:

calculating a frequency domain voice probability signal according to the following formula:

$$pF(f) = \begin{cases} 1 & |E_2/E_1| < T_S \\ (T_E - |E_2/E_1|)/(T_E - T_S) & |E_2/E_1| \in [T_S, T_E] \\ 0 & |E_2/E_1| > T_E \end{cases}$$

where f denotes the frequency, $E_1$ denotes the amplitude of the first self-adaptive frequency domain signal, $E_2$ denotes the amplitude of the second self-adaptive frequency domain signal, pF denotes the frequency domain voice probability signal, $T_S$ denotes an average amplitude ratio of near-end voice signals in the signal of the auxiliary transmitter and the signal of the primary transmitter, and $T_E$ an average amplitude ratio of nonlinear echo component signals in the signal of the auxiliary transmitter and the signal of the primary transmitter, wherein $T_E > T_S > 1$.

10. The method according to claim 7, wherein, the performing echo matching to the second self-adaptive frequency domain signal according to the amplitude of the first self-adaptive frequency domain signal and the amplitude of the second self-adaptive frequency domain signal specifically comprises:

dividing a full frequency into M subbands with subband boundaries of $B_i - B_{M+1}$, acquiring, in each of the subbands, the power of the first self-adaptive frequency domain signal $E_1$ and the power of the second self-adaptive frequency domain signal $E_2$, and performing division and evolution to the power to obtain a matching function $H_m$:

$$H_m(f) = \sqrt{\frac{\sum_{k=B_1}^{k=B_{i+1}} E_1^2(k)}{\sum_{k=B_1}^{k=B_{i+1}} E_2^2(k)}}, \; B_{i+1} > f \geq B_i$$

where $i \in [1,M]$ denotes a subband number, f denotes the frequency, k denotes a frequency sampling point in a subband, $E_1(k)$ denotes the amplitude of the first self-adaptive frequency domain signal at the frequency sampling point, and $E_2(k)$ denotes the amplitude of the second self-adaptive frequency domain signal at the frequency sampling point; and multiplying the second self-adaptive frequency domain signal $E_2$ by the matching function $H_m$ and then by a factor Ag for amplitude matching so as to obtain a matched echo $Y_m$:

$$Y_m(f) = Ag(f) \cdot E_2(f) H_m(f);$$

subtracting the matched echo $Y_m$ from the first self-adaptive frequency domain signal, and then multiplying the result of subtraction by the frequency domain voice probability signal:

$$E_{out}(f) = [E_1(f) - Y_m(f)] \cdot pF(f),$$

where pF denotes the frequency domain voice probability signal, and Ag denotes a factor related to pF and declines with the increase of pF.

\* \* \* \* \*